Oct. 3, 1967   J. C. YOUNG   3,344,837
FOLDING PANEL ASSEMBLY
Filed July 15, 1965   6 Sheets-Sheet 1

INVENTOR:
JOHN C. YOUNG
BY
Howson & Howson
ATTYS.

Oct. 3, 1967

J. C. YOUNG 3,344,837

FOLDING PANEL ASSEMBLY

Filed July 15, 1965

INVENTOR:
JOHN C. YOUNG
BY Howson &
Howson
ATTYS.

Oct. 3, 1967  J. C. YOUNG  3,344,837

FOLDING PANEL ASSEMBLY

Filed July 15, 1965

INVENTOR:
JOHN C. YOUNG
BY Howson & Howson
ATTYS

United States Patent Office 3,344,837
Patented Oct. 3, 1967

3,344,837
FOLDING PANEL ASSEMBLY
John C. Young, Reedsville, Pa., assignor to Hinge Gear Products, Inc., Fairfax, Va., a corporation of Pennsylvania
Filed July 15, 1965, Ser. No. 472,210
18 Claims. (Cl. 160—189)

The present invention relates to a folding panel assembly which may be used in an opening in a structure, such as the door opening in a building and which is movable between an extended and a retracted or stacked position.

The folding panel assembly of the present invention may be used as a door for a garage or the like. Some of these prior garage doors typically comprised of a plurality of panel members that were connected to one another by conventional hinge means and included a trackway section on opposite side jambs of the opening and a horizontal trackway section extending back from the top edge of the opening generally perpendicular thereto. By this arrangement, the panels were movable from an extended position in the vertical trackway section closing the opening to an upper position in the horizontal trackway, the panel members in both positions being disposed in edge-to-edge relation. This arrangement was comparatively complicated, and takes up a substantial amount of space. Furthermore, the force required to raise this type of panel assembly from a lowered position to a retracted position is not uniform. In other words, the force required to raise the assembly initially is greater than when the assembly is partially open and vice-versa.

In another type of prior art folding panel assembly, the adjacent panels of the assembly are connected to each other along side edges by hinges for free pivotal movement with respect to one another and each panel is swivelly suspended from a trolley which rides in guide means such as a track. With this arrangement the panels may be moved between an extended position in edge-to-edge relation and a retracted or stacked position in face-to-face array. However, one of the difficulties with this type of panel assembly is the free, uncontrolled pivotal movement of the panels during actuation of the assembly between extended and retracted positions. For example, when the lead panel of a multi-panel assembly is actuated to retract or stack the panels, there is a tendency for the lead panel and the adjacent panel to which it is hinged to completely collapse or fold with respect to one another and for successive panels to thereafter collapse or fold in a like manner. Even when considerable care is exercised in actuating the assembly, the panels, nevertheless, tend to slam against one another. Moreover, the weight of the panels accumulates during stacking or extension thereof and the force required to move the assembly to the stacked position is progressively greater as the panels approach the fully retracted or stacked position; and likewise, the force required to move the assembly to the extended position is progressively greater as the panels approach the fully extended position.

With the foregoing in mind, a primary object of the present invention is to provide an improved folding panel assembly for an opening in a structure operable between an extended position closing the opening and a retracted position exposing the opening wherein pivotal movement of the panels in the assembly is controlled and limited in a predetermined manner during extension or retracttion of the assembly to eliminate slamming together of the panels.

More specifically, the present invention provides an improved folding assembly in which adjacent panel members are connected to the structure by control means which cooperates with the pivot means to effect controlled, limited pivotal movement of the panels with respect to one another during movement of the assembly between extended and retracted positions. With this arrangement there is an approximately equal angular relation between adjacent panels of the assembly during folding and extension thereof and the force applied to the lead panel of the assembly to actuate the assembly is transmitted to all of the panels so that the force required to move the assembly is uniform at all times.

The present invention also provides a folding panel assembly which may be mounted in a trackway for movement between extended and retracted positions, and wherein guide means is provided to insure proper movement of the assembly in the trackway and preclude binding during movement of the panels.

Another feature of certain embodiments of the present invention is the provision of a pocket adjacent one end of the trackway at one side of the opening which receives the panels in the retracted or stacked position, and guide means so that the entire assembly is out of the pocket to completely close the opening in the extended position, thereby insuring full utilization of the assembly, and the assembly is retracted into the pocket in the retracted position so that the lead panel is flush with the outer edge of the pocket to serve as a closure for the same, thereby presenting a pleasing architectural appearance.

Thus, an object of the present invention is to provide a folding panel assembly characterized by novel features of construction and arrangement, whereby a uniform force is required to open and close the panel assembly.

Another object of the present invention is to provide a folding panel assembly which takes up a minimum amount of space and which may be easily moved between extended and retracted positions and wherein the panels stack neatly in a quiet manner in a very small space.

A further object of the present invention is to provide a folding panel assembly whereby the panel members may be moved slightly in a single plane to partially open the assembly which is useful in garages to permit ventilation.

Still another object of the present invention is to provide a folding panel assembly which does not have to be precisely mounted in a predetermined fixed position in the opening and yet provides an effective seal of the opening and therefore is easy to install.

A still further object of the present invention is to provide a folding panel assembly characterized by means for sealing the entire assembly in the closed position and which is of a very simple construction so that it is highly economical to make and extremely trouble free in operation.

These and other objects of the present invention and various features and details of the construction thereof are more fully set forth hereinafter with reference to the accompanying drawings, in which:

The folding panel assembly of the present invention is designed for use in an opening in a structure, for example, a door opening in a building and is operable between an extended position closing the opening and a retracted or stacked position exposing the opening. The folding panel assembly comprises broadly a plurality of panel members, pivot means connecting the panel members in edge-to-edge relation in the extended position and in face-to-face relation in the retracted or stacked position and control means connecting the assembly to the structure. The control means and pivot means cooperate to effect controlled pivotal movement of the panel members with respect to one another during movement between extended and retracted positions.

Figures 1, 7A:
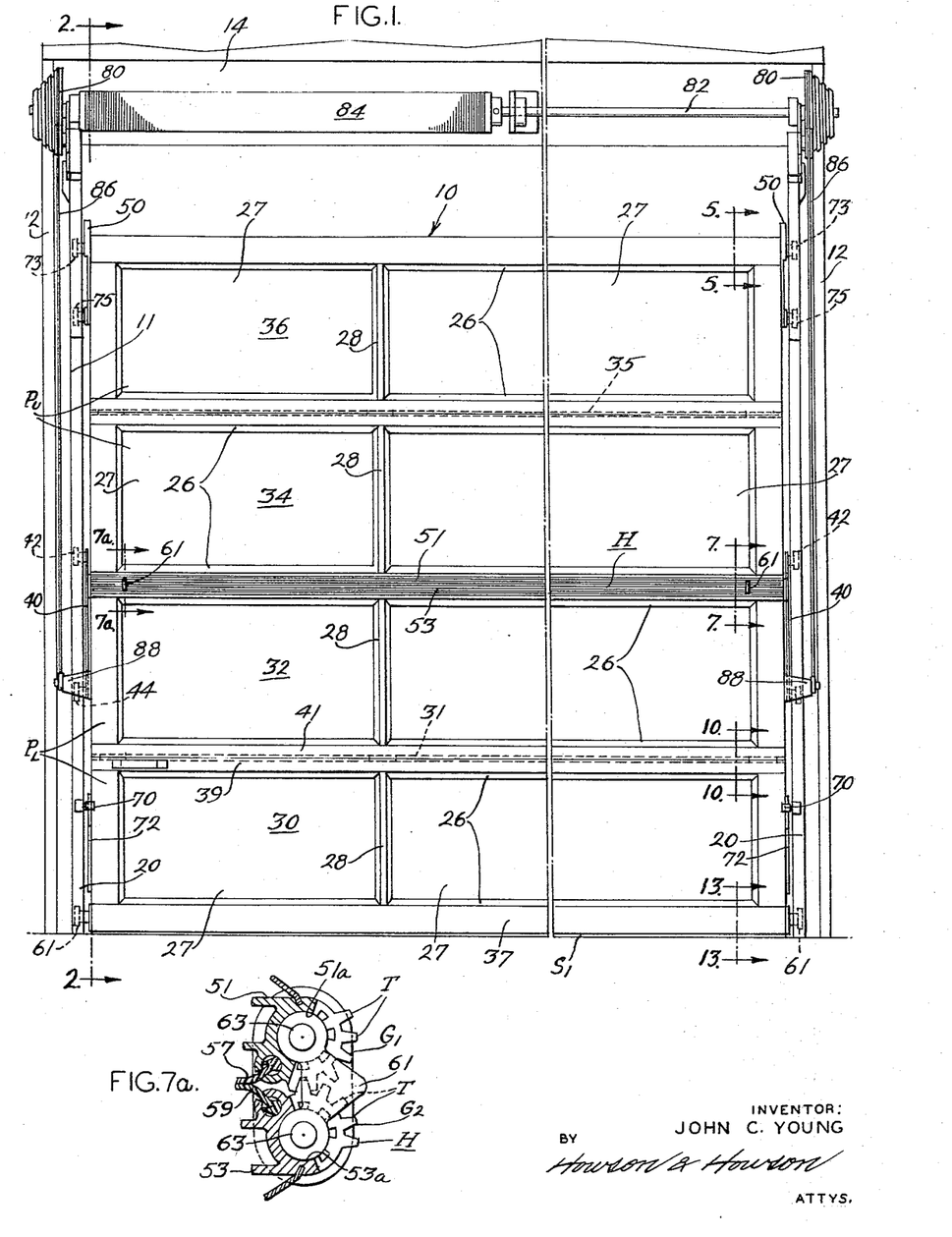
FIG. 1 is a front view of an embodiment of folding panel assembly made in accordance with the present invention.
FIG. 7a is a sectional view taken on lines 7a—7a of FIG. 1.
Figure 2:
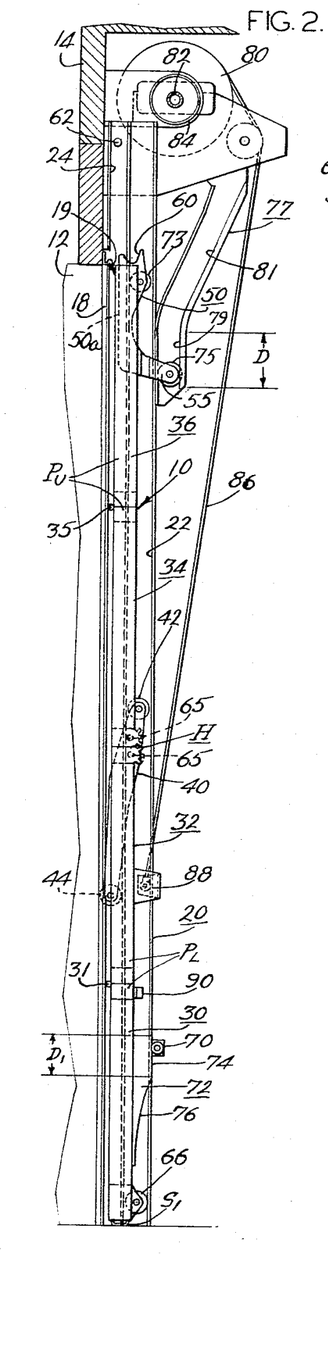
FIG. 2 is an enlarged sectional view taken on lines 2—2 of FIG. 1 showing the assembly in the closed or extended position.

Considering now more specifically the structural details and arrangement of folding panel assembly in accordance with the present invention, there is illustrated in FIG. 1 a panel assembly which may be employed as a garage door or the like and wherein the panels are movable in a vertical direction between extended and retracted positions. The folding panel assembly generally designated by the numeral 10 is mounted in an opening 11 in a structure defined by vertical upright spaced apart side jambs 12 and a lintel 14 across the upper edge of the opening 11. Sealing elements 18 are provided on the side jambs and a sealing strip 19 is provided on the lower edge of the lintel 14 to engage the folding panel assembly in the extended position thereby to provide a weatherproof and/or sound-retarding seal.

The folding panel assembly 10 is mounted for movement between raised and lowered positions in confronting vertically extending trackways 20 mounted on the side jambs 12, each of the trackways 20 consisting in the present instance of a pair of side-by-side inner and outer channels 22 and 24.

Figure 10:
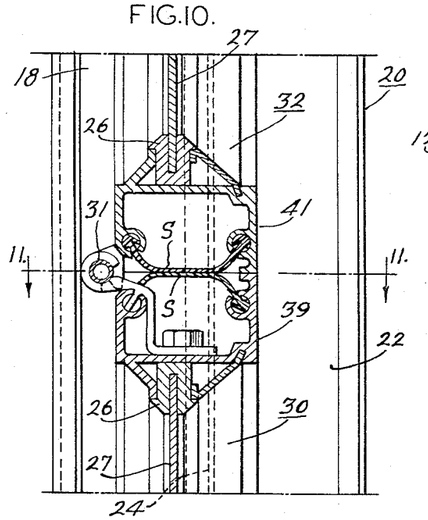
FIG. 10 is an enlarged sectional view taken on lines 10—10 of FIG. 1.
Figure 11:
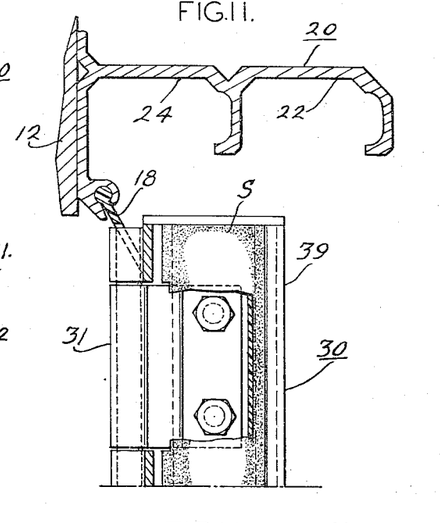
FIG. 11 is a sectional view taken on lines 11—11 of FIG. 10.
Figure 12:
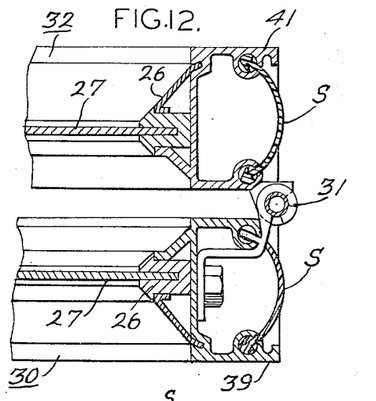
FIG. 12 is a view similar to FIG. 10 showing the confronting ends of adjacent panels in the open position.
Figure 13:
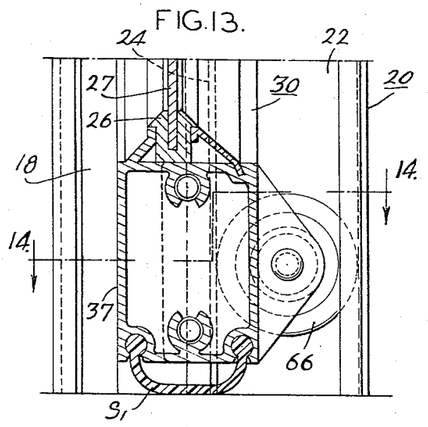
FIG. 13 is an enlarged sectional view taken on lines 13—13 of FIG. 1.
Figure 14:
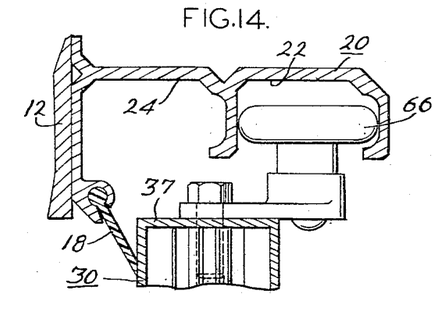
FIG. 14 is an enlarged sectional view taken on lines 14—14 of FIG. 13.
Figure 15:
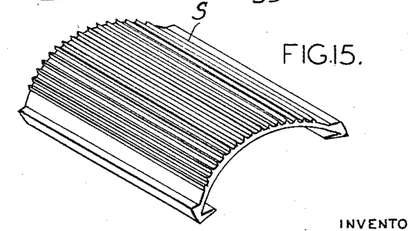
FIG. 15 is a fragmentary perspective view of the sealing element used between the panels.

The folding panel assembly comprises a plurality of panel members, each panel member being of conventional construction and consisting of elongated side rails 26, a plurality of panel sections 27 between the side rails 26 and stiles 28 separating the panel sections of each panel member. In the present instance the folding panel assembly comprises four panel members 30, 32, 34 and 36 arranged in pairs, a lower pair $P_L$ including panel members 30 and 32 and an upper pair $P_U$ including the panel members 34 and 36. The panel members of each pair are connected along their adjacent side rails by conventional hinges. Thus the panel members 30 and 32 are pivotally connected by hinge 31 and the panel members 34 and 36 are pivotally connected by hinge 35. Sealing means is provided at the hinged connection between adjacent panels of each pair to provide an effective seal between the panel members when the folding panel assembly is in an extended position. The seal means for the panels 30 and 32 of the lower pair $P_L$ is best illustrated in FIGS. 10 and 12. As shown therein, elongated extruded members 39 and 41 are mounted on the confronting rails of the panel members 30 and 32, each of the extruded members mounting a curved sealing element S. Accordingly, when the panels are in an extended position as shown in FIG. 10, the arcuate sealing elements S abut as illustrated to provide an effective seal at the juncture of the panels. A similar seal arrangement is provided for the panels 34 and 36. The bottom of the lowermost panel 30 also mounts an extruded member 37 which carries an arcuate seal S along its lower edge engaging the bottom surface of the opening when the panel assembly is in an extended position.

Figures 7, 8, 9:
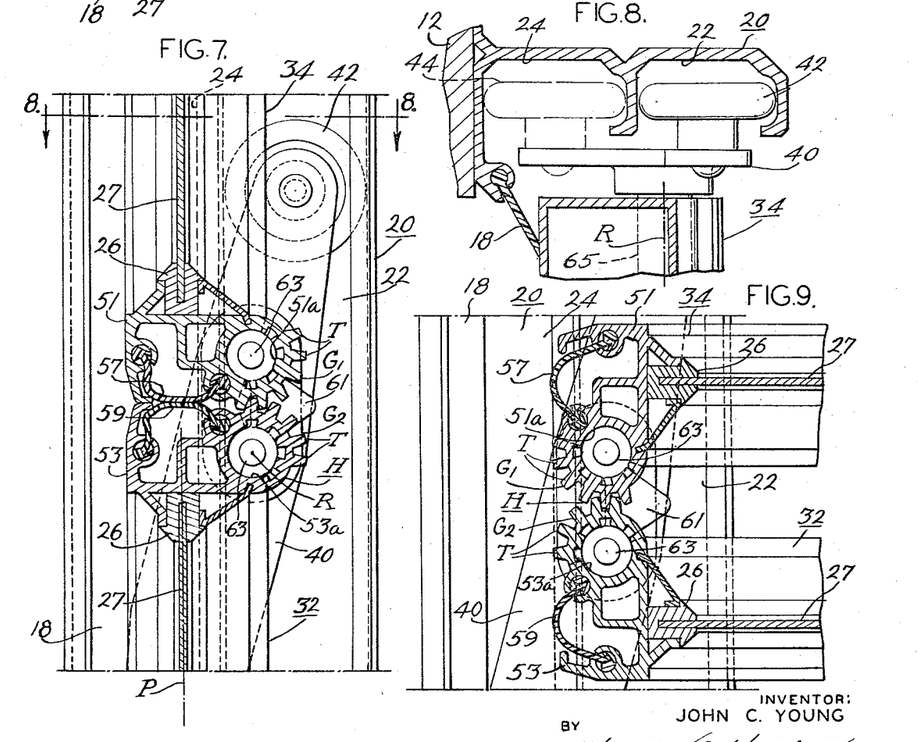
FIG. 7 is an enlarged sectional view taken on line 7—7 of FIG. 1 showing the control gear arrangement for the panel assembly.
FIG. 8 is an enlarged sectional view taken on line 8—8 of FIG. 7 showing the torque control arm mounting arrangement.
FIG. 9 is an enlarged sectional view similar to FIG. 7 showing the position of the control gear when the panels are in the stacked position.

The adjacent panel members 32 and 34 of the pairs $P_L$ and $P_U$ are connected by a control hinge gear arrangement generally designated H. In the present instance the hinge gear arrangement H comprises a pair of elongated extruded members 51 and 53 secured to the rail members of the adjacent panels 32 and 34. Each of the elongated members has an inwardly offset section of generally arcuate cross section having a plurality of circumferentially spaced, longitudinally extending teeth T around a portion thereof defining segmental gear portions $G_1$ and $G_2$ which intermesh along the length of the panel thereby providing a continuous connection between and co-action with adjacent panel members of the assembly. As best illustrated in FIG. 7, the axis of rotation R of the segmental gear portions is offset inwardly to a plane P through the panel members. The elongated extruded members 51 and 53 also mount longitudinally extending sealing element 57 and 59 which in the extended position of the panels engage as illustrated in FIG. 7. The segmental gear portions are maintained in intermeshing relation by means of a pair of connecting links 61 disposed slightly inwardly from the terminal ends of the members 51 and 53 and supported on the reduced tip portion 63 of pins 65 carried by a main torque control arm 40.

The folding panel assembly is mounted in the opening for controlled movement of the panel members between raised and lowered positions, in a manner providing an approximately equal angular relation between adjacent panels of the assembly during folding and extension thereof so that the force applied to the lead panel of the assembly to actuate the same is transmitted to all of the panels and therefore, the force required to move the assembly is uniform at all times. This controlled movement of the panels also eliminates slamming together of the panels and binding during movement thereof between the extended and stacked positions. In the present instance, this is accomplished by control guide means mounting the assembly in the trackway. More specifically, the folding panel assembly includes a pair of main torque control arms 40, one at each side of the folding panel assembly having rollers at its terminal ends 42 and 44 which ride in the inner and outer channels 22 and 24 respectively of the trackway 30. The torque control arm 40 is connected to the folding panel assembly adjacent the pivotal connection of the pair of panels at the hinge gear. The torque control arm 40 mounts the pins 65 which rotatably engage in central openings 51a and 53a of the meshing segmental gear portions $G_1$ and $G_2$. A guide roller 66 is also provided adjacent the lower end of the lead panel member 30 which rides in the inner channel 22 of the trackway as illustrated for example in FIGS. 3 and 8. The control means further includes an L-shaped bracket 50 mounted at each side edge portion of the uppermost panel member 36, the vertical leg 50a of the bracket 50 carrying a guide roller 73 engaging in the channel 22 of the trackway, the short leg 55 of the bracket 50 mounting a roller 75 engaging in a short track 77 having a vertical section 79 aligned with the channels 22 and 24 and an inclined section 81 at an angle to the channels 22 and 24. The upper terminal end of the bracket 50 has a yoke-like portion 60 which engages a stationary pin 62 at the top of the trackway in the channel 24 and thus limits the upward extent of the folding panel assembly as described in more detail hereinafter.

In the present instance, the folding panel assembly is designed so that it may be raised a predetermine height without breaking the panels, for example, to facilitate venting the space inside of the opening. To this end roller 70 is mounted adjacent the side of the trackway on each side of the jamb at a predetermined distance from the floor of the opening and the lowermost panel 30 is provided with a cam member 72 which rides on the roller when the folding panel assembly is raised and lowered. The cam member 72 has a flat 74 which engages with the roller 70 and prevents the panels from breaking or pivoting relative to one another during the initial raising movement of the entire assembly and a curved or contoured portion 76 which permits the panels to pivot when the entire assembly has been raised to a given height. It is noted that when the panel members are moved to a closed position, the roller 75 engages in the vertical section 79 of the track 77 and the flat 74 engages the roller 70 to provide a positive means securely closing the panels in the extended position. The distance D of the vertical section 79 of track 77 is approximately equal to the height $D_1$ of the flat 74 on the cam member 72.

Means is provided for semi-automating the raising of the folding panel assembly from the extended to the retracted position. In the presence instance, this means comprises a pair of tapered drums 80 mounted on a shaft 82 rotatably supported at the rear face of the lintel and a torsion spring 84 which normally rotates the shaft 82 in one angular direction. A cable 86 is secured at one end to each drum and at its other end to a bracket 88 secured to the midpoint of the panel member 32 of the panel assembly. By this arrangement the drums are normally urged in a direction to rotate the cable on to the drum by the torsion spring and thus assist in raising the folding panel assembly from the extended to the retracted position.

Figures 3, 4, 16, 17:
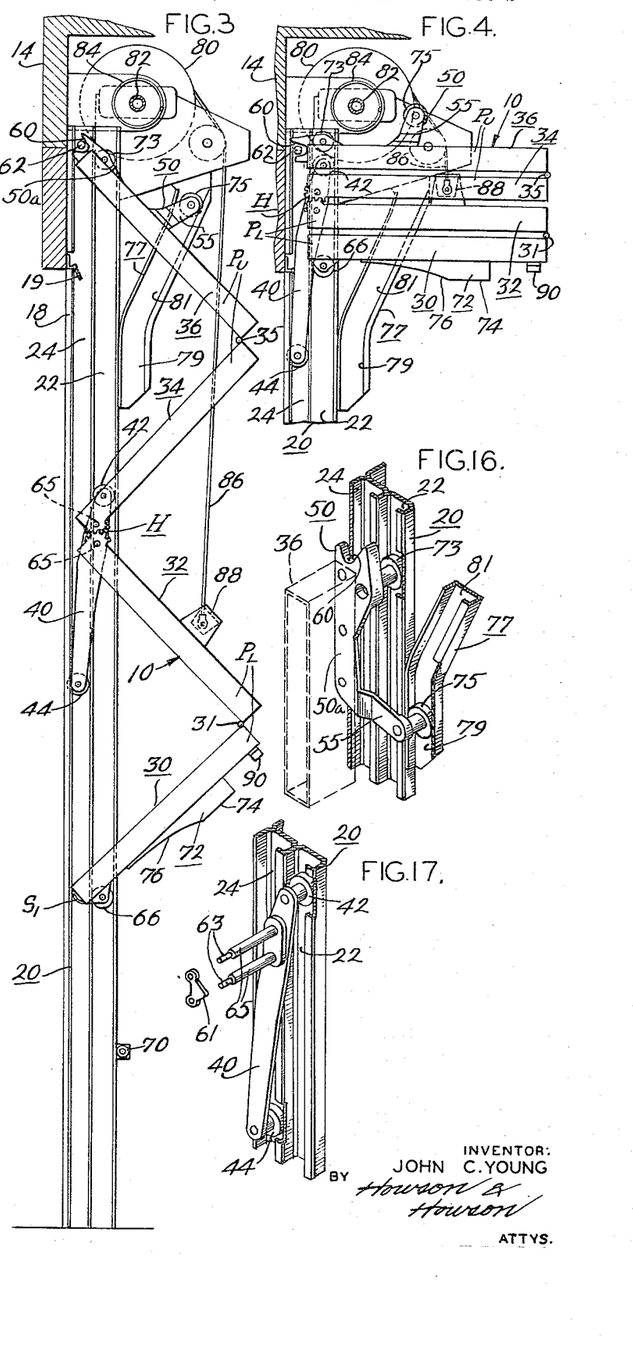
FIG. 3 is a sectional view similar to FIG. 2 showing the assembly in the partially extended or partially open position.
FIG. 4 is a fragmentary sectional view similar to FIG. 2 showing the assembly in the fully detracted or stacked position.
FIG. 16 is a fragmentary perspective view of the upper control arm of the panel assembly.
FIG. 17 is a fragmentary perspective view of the lower control arm at the control linkage of the panel assembly.
Figure 5:
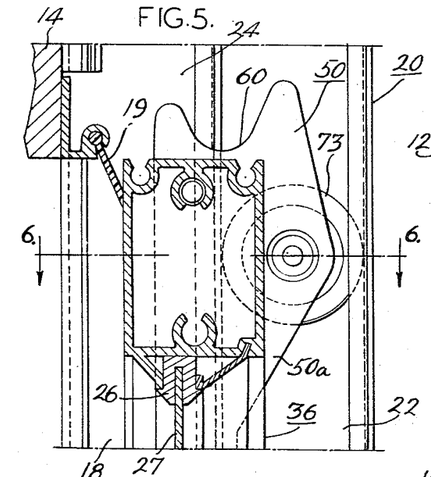
FIG. 5 is an enlarged sectional view taken on line 5—5 of FIG. 1.
Figure 6:
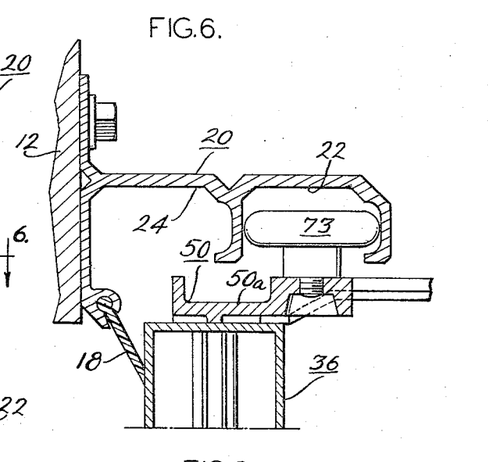
FIG. 6 is an enlarged sectional view taken on line 6—6 of FIG. 5.

In operation, the folding panel assembly may be raised for example from its lowered position to the retracted position by gripping a handle 90 on the lowermost panel 30 and applying a slight upward pull. Due to the engagement of the roller 70 with the flat portion 74 of the cam member 72, the panel members remain in a truly vertical position during the initial upward movement thereof. During this initial raising the roller 75 also engages in the vertical section 79 of the track 77. When the roller 70 engages the curved porton 76 of the cam 72 and the roller 75 rides on the inclined section 81 of track 77, the panel members begin to break or pivot relative to one another as illustrated in FIG. 3. It is noted at this point that the yoke 60 engages the pin 62. The lead panel 30 starts to pivot in a clockwise direction about its pivotal connection to the next adjacent panel 32 and by reason of the rotation of segmental gears $G_1$ and $G_2$, and equal and opposite directional movement of the adjacent panel 32 takes place. Simultaneously, the panel 34 of the upper pair $P_U$ also pivots in a clockwise direction and its counterpart panel 36 pivots in the opposite direction. Thus, in the partially extended position, the panels of the assembly are disposed in a zig-zag array as shown in FIG. 3 and there is an approximately equal angular relation between adjacent panels of the assembly. It is noted that upward translation of the panel assembly is limited by engagement of the yoke member against the stationary pin 62 and that the engagement of the roller 75 in the inclined portion 81 of track 77 insures engagement of the yoke with the pin. Engagement of the yoke with the pin insures stacking of the panels at a predetermined height above the lower edge of the lintel. It is noted that this uniform angular relationship between the panels is maintained during the entire raising thereof by reason of the coaction between hinge gear and guide means mounting the assembly in the trackway. By this arrangement, the force required to raise and lower the panel assembly is uniform. Further, the panels do not bang together and accordingly, the operation is extremely quiet. It is noted further that during the raising of the panels, the drums are urged by the torsion spring to rotate in a direction to wind the cable on to the drum, thereby assisting in raising the panels. When the assembly has been raised to the extreme retracted position shown in FIG. 4, the panel members are in confronting overlying relationship and take up a minimum of space and the pocket in the area behind the lintel. In order to lower the panel assembly, the handle is simply gripped by the user and the lowermost panel is drawn downward whereby the panels again pivot uniformly relative to one another and hence the force to lower the panels is uniform for the entire closing action. It is noted that during raising of the panels when the roller 75 disengages the inclined section 81 of track 77, the engagement of yoke 60 with pin 62 provides a pivot for the uppermost panel during the initial movement of panels from the stacked to extended positions and also provides a pivot during terminal movement of the panels from the extended to the stacked position. This contrasts with prior panel assemblies where the panels tended to clash together and the force required to raise or lower the panel assemblies was not uniform.

Another embodiment of folding panel assembly in accordance with the present invention is shown in FIGS. 18–24 inclusive. The folding panel assembly is mounted in an opening in a structure and is adapted for movement between raised and lowered positions in confronting vertically extending trackways 120 (only one side shown) mounted on the side jambs defining the sides of the opening, each of the trackways 120 consisting of a pair of side by side inner and outer channels 122 and 124.

This embodiment of folding panel assembly also comprises four panel members 130, 132, 134 and 136 arranged in pairs, a lower pair $P_{L-1}$ including panel members 130 and 132 and an upper pair $P_{U-1}$ including the panel members 134 and 136. The panel members of each pair are connected along adjacent side rails by conventional hinges. Thus, the panel members 130 and 132 are pivotally connected by hinge 131 and the panel members 134 and 136 are pivotally connected by hinge 135. Sealing means $S_3$ similar to those described previously are provided at the juncture of the panel members of each pair to effectively seal the assembly in the extended position. A sealing element $S_4$ is also provided on the lowermost panel 130 which engages the lower surface defining the opening.

Figure 18:
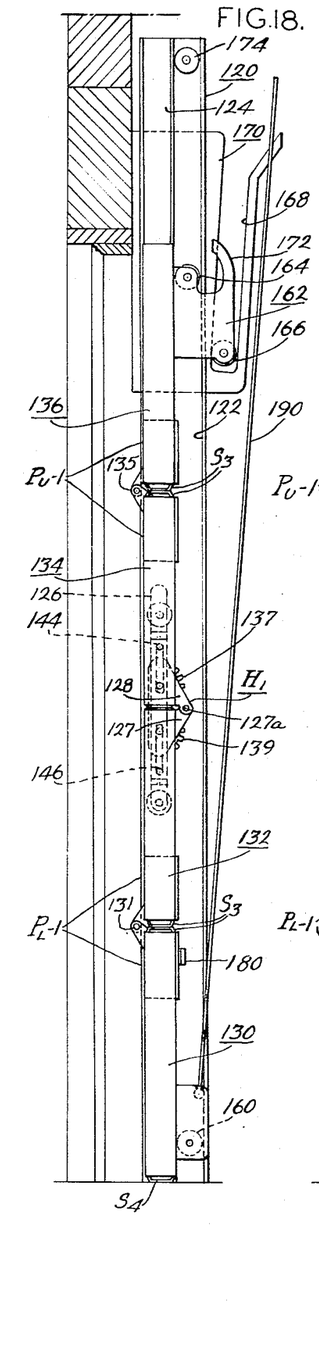
FIG. 18 is an end view of another embodiment of panel assembly constructed in accordance with the present invention.
Figures 19, 20, 23:
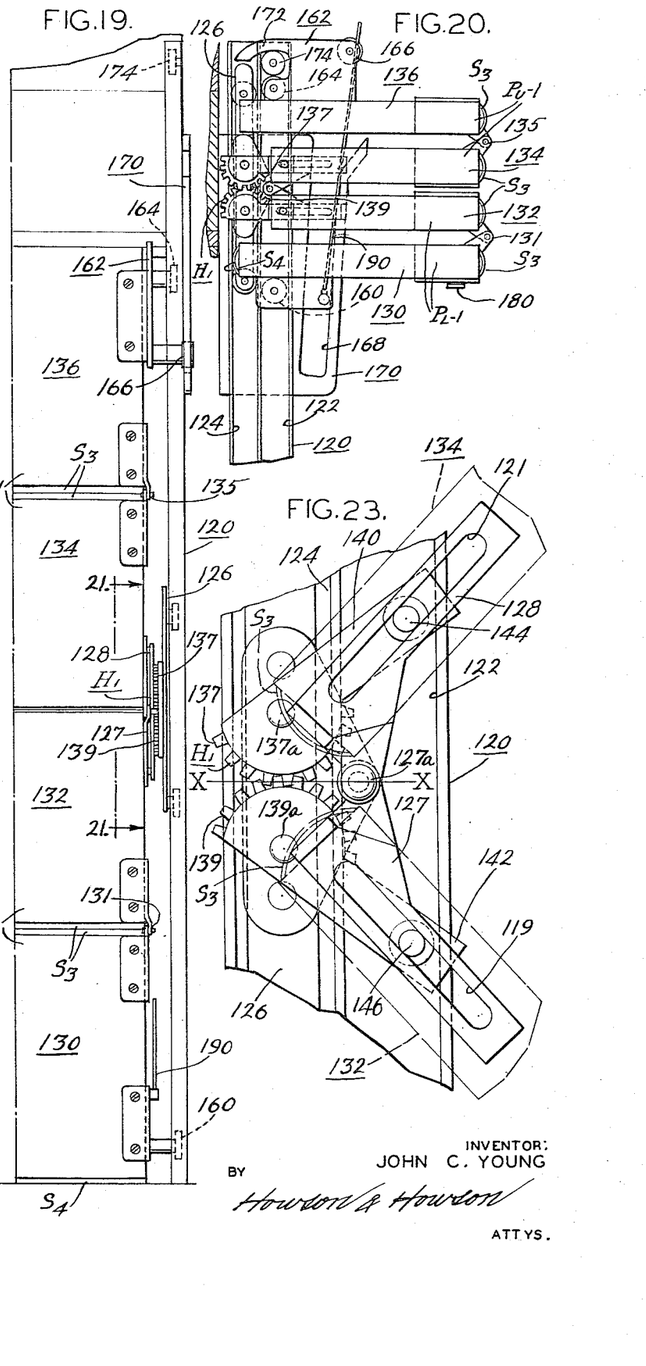
FIG. 19 is a fragmentary front view of the panel assembly.
FIG. 20 is a view similar to FIG. 18 showing the stacked position.
FIG. 23 is a fragmentary plan view of the control gear arrangement.

The adjacent panels of each pair of panels are connected to one another by pivot means and a novel control means which cooperates with the pivot means to effect controlled movement of the panel members of the assembly between an extended position closing the opening shown in FIG. 18 and a retracted position exposing the opening as shown in FIG. 20. In accordance with the present invention, there is an approximately equal angular relation between adjacent panels of the assembly during folding and extension thereof so that the force applied to the lead panel of the assembly is transmitted to all of the panels and therefore, the force required to move the assembly is uniform. This controlled movement of the panels also eliminates slamming together and binding during movement thereof between extended and retracted positions.

Figures 21, 22, 24, 25:
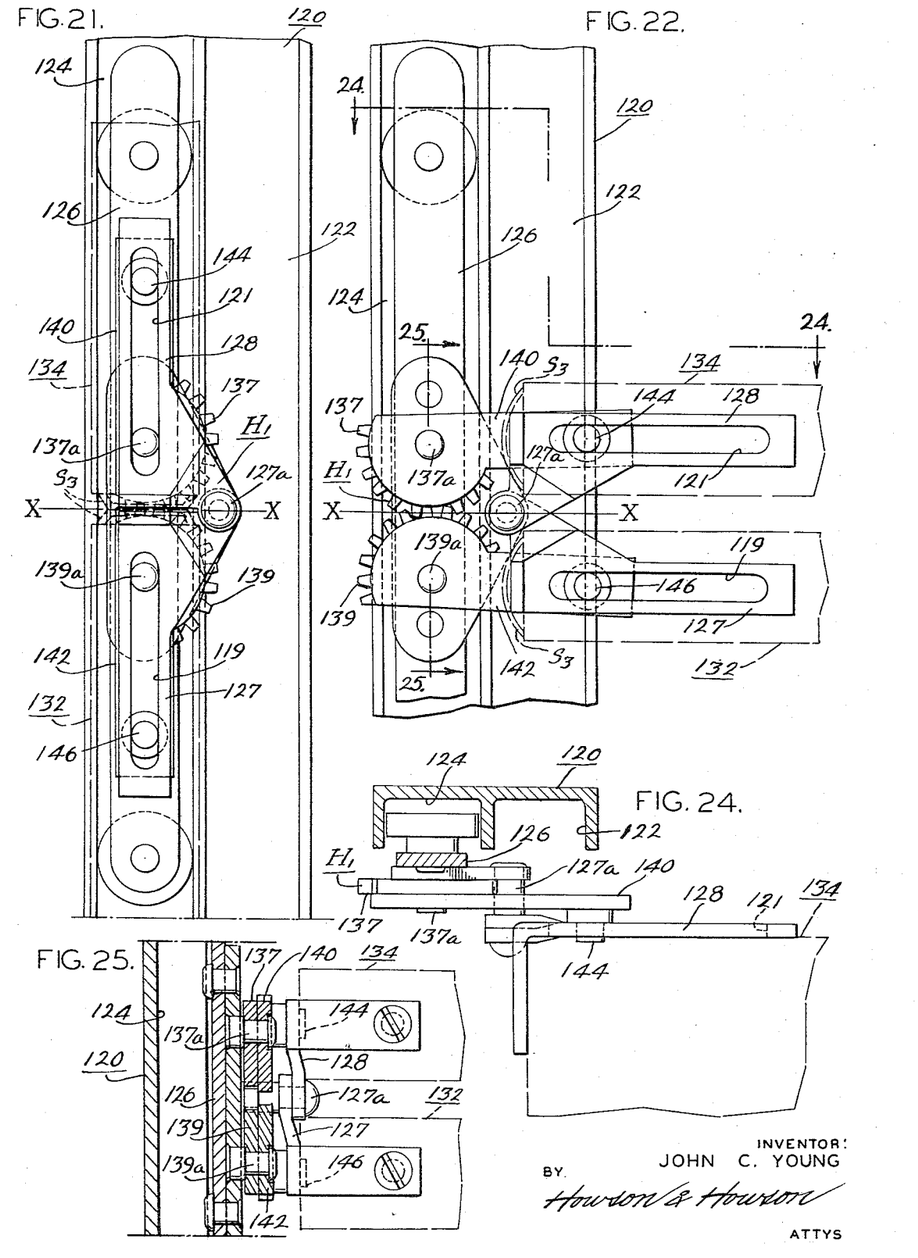
FIG. 21 is an enlarged side elevational view showing the control hinge gear arrangement of the second embodiment.
FIG. 22 is a view similar to FIG. 21 showing the position of the control gear when the panels are in a stacked position.
FIG. 24 is a sectional view taken on line 24—24 of FIG. 22.
FIG. 25 is an enlarged sectional view taken on line 25—25 of FIG. 22.

The pivot means is in the form of a hinge gear arrangement $H_1$, the details of which are best illustrated in FIGS. 21–23 inclusive. As shown therein, the hinge gear $H_1$ connects the adjacent panels 132 and 134 of the pairs of panels at opposite ends and at each end the hinge gear $H_1$ is identical in construction. Thus, the hinge gear $H_1$ comprises a pair of links 127 and 128 suitably mounted on the end face of the panels 132 and 134, the links being pivotally connected to one another and to a torque control bar 126 by a pin 127a. The torque control bar 126 has guide rollers which engage in channel 124 of the trackway and disposed between the links and the guide bar is a pair of meshing segmental gears 137 and 139 which are pivotally connected to the guide bar as at 137a and 139a. The segmental gears have arm extensions 140 and 142 which mount pins 144 and 146 engaging in the slotted openings 119 and 121 of the link members 127 and 128 respectively, to permit relative movement of the arm extensions and the links. The pin and slot arrangement for the links and arms may be reversed. It is noted that the pivotal axis of the links about pin 127a lies in a plane X through the meshing center line of the gears 137a and 139a and is disposed to one side of the panel members opposite the pivots 131 and 135.

The control means which cooperates with the pivot means to effect the controlled movement of the panels includes a guide roller 160 adjacent the lower edge of the lowermost panel member 130 and a bracket 162 secured to each of the side edges of the uppermost panel 136 which mounts a pair of guide rollers 164 and 166, the guide roller 164 riding in the channel 122 of the trackway and the guide roller 166 engaging in a slot 168 in a plate 170 which is inclined at an angle to the trackway. The bracket 162 further includes a curved finger 172 which engages and cooperates with a fixed roller 174 at the top of the channel 122 of the trackway when the panels are moved to a stacked position as shown in FIG. 20.

Considering now the operation, assume that the panels are in the lower position as shown in FIG. 18. Now when it is desired to raise the panels, the user grips a handle 180 on the lowermost panel 130 and pulls it slightly inwardly and upwardly. This movement effects a clockwise rotation of the lead panel or lowermost panel 130 about its pivot point and by reason of the hinge gear $H_1$ connecting the pairs of panels an equal and opposite directional movement of the adjacent panels is effected. The pivotal movement of the first pair of panels effects through the segmental gears corresponding movement of the upper pair of panels. Thus, in the partially extended position, the panels of the assembly are disposed in a zig-zag array as shown, and there is an approximately equal angular relation between adjacent panels of the assembly. During this movement, the guide roller 166 moves in the slot 168 to further control pivotal movement of the panels. Further, during opening of the panels the entire assembly is translated upwardly to a point where the pocket defined by the finger 172 engages over the fixed roller 174. The panels then close to a fully stacked position above the lintel. A similar lifting system as described in connection with the previous embodiment may be employed in the present arrangement, except that the lift cables 190 are attached to the lowermost panel 130 adjacent the lower end thereof to normally rotate this panel in a counterclockwise direction with respect to FIG. 18. By this arrangement, external pressures acting on the front of the door, for example, wind pressure, are resisted.

While particular embodiments of the present invention have been illustrated and described herein, it is not intended to limit the invention and changes and modifications may be made herein within the scope of the following claims.

I claim:
1. A folding panel assembly for an opening in a structure operable between an extended limit position closing the opening and a retracted limit position exposing the opening, comprising a pair of spaced apart parallel trackways in the sides of the opening, each trackway consisting of a pair of parallel inner and outer channels, at least two pairs of panel members, means pivotally connecting the panel members of each pair along adjacent side edges, control hinge gear means connecting adjacent panel members of the pairs of panels and control means for connecting said panel members to said structure, said control means including a torque control arm at each side of said folding panel assembly adjacent said hinge gear means, said torque control arm having guide rollers at opposite terminal ends engaging in said channels, said hinge gear means and control means cooperating to effect controlled movement of said panel members with respect to one another between extended and retracted positions, said torque control arm maintaining the pivotal axes of the hinge gears in a predetermined common plane during movement of said panel members between said extended and retracted positions.

2. A folding panel assembly as claimed in claim 1 wherein said hinge gear means consists of a plurality of circumferentially spaced elongated gear teeth extending along the side edges of adjacent panels of the pairs of panels and means to maintain the gear teeth of the adjacent panels in meshing engagement.

3. A folding panel assembly as claimed in claim 2 wherein said means connecting each torque control arm to said assembly includes a pair of pins engaging through the rotational axis of said hinge gear members.

4. A folding panel assembly as claimed in claim 1 including sealing means along the confronting side edges of adjacent panels which cooperate and engage with one another in the extended position of the folding panel assembly to provide a seal between all of the panel members.

5. A folding panel assembly as claimed in claim 1 including seal means adjacent the sides and at least one end edge of the opening which cooperate and engage with the panels in the extended position to provide a seal between the panel assembly and the opening in the structure.

6. A folding panel assembly as claimed in claim 1 including means for assisting in movement of the panels from the extended to the retracted position including a spring biased shaft pivotally mounted adjacent one side of the opening, a drum mounted at each end of the shaft and a cable connected to the drum and to one end of the panel members whereby said cable is wound on to the drum during movement of the panels from the extended to the retracted position.

7. A folding panel assembly as claimed in claim 2 including a pair of links mounted adjacent opposite terminal ends of said elongated meshing gear teeth to prevent spiralling of the meshing gears during movement of the panels between extended and retracted positions.

8. A folding panel assembly as claimed in claim 1 wherein said pivot means comprises a hinge gear assembly at each end of adjacent panels of the pairs of panels, each said hinge gear assembly including a pair of links mounted on the end face of each of the adjacent panels of the pairs of panels, a control bar connecting the links to one another and to the control bar, a pair of meshing segmental gears pivotally connected to the guide bar, said gears having arm extensions and means connecting one of the links to one arm extension and the other link to the other arm extension.

9. A folding panel installation for an opening in a structure operable between an extended limit position closing the opening and a retracted limit position exposing the opening comprising a pair of parallel trackways in the sides of the opening, each trackway consisting of inner and outer channels, a track at one end of the trackway having a section parallel to the channels and a section inclined to the channels, at least two pairs of panel members, means pivotally connecting the panel members of each pair along adjacent side edges, hinge gear means connecting adjacent panel members of the pairs of panels and control means for connecting said panel members of said structure, said hinge gear means and control means cooperating to effect controlled movement of said panel members with respect to one another between extended and retracted positions, said control means including a bracket secured to one end panel member having a yoke-like portion adapted to engage a stationary pin in one of the channels to provide a pivot point during movement of the assembly from extended to retracted position and a guide roller on said bracket engageable in said track.

10. A folding panel installation as claimed in claim 9 including a cam member mounted on the end panel opposite said one end panel member and a cam follower mounted on said structure engageable with said cam member, said cam member having a flat and a contoured section, said cam follower adapted to engage said flat during initial movement of the assembly in the trackway from extended to retracted position and during terminal movement to the extended positions to maintain the panels in edge to edge relation.

11. A folding panel assembly as claimed in claim 9 including a torque control arm at each side of said folding panel assembly adjacent said hinge gear means, said torque control arm having guide rollers at opposite terminal ends engaging in said channels, one of said rollers engaging in said inner channel and the other of said rollers engaging in said outer channel.

12. A folding panel assembly as claimed in claim 9 wherein said hinge gear means consists of a plurality of circumferentially spaced elongated gear teeth extending along the side edges of adjacent panels of the pairs of panels and means to maintain the gear teeth of the adjacent panels in meshing engagement.

13. A folding panel assembly as claimed in claim 11 wherein said means connecting each torque control arm to said assembly includes a pair of pins engaging through the rotational axis of said hinge gear members.

14. A folding panel assembly as claimed in claim 9 including sealing means along the confronting side edges of adjacent panels which cooperate and engage with one another in the extended position of the folding panel assembly to provide a seal between all of the panel members.

15. A folding panel assembly as claimed in claim 9 including seal means adjacent the sides and at least one end of the opening which cooperate and engage with panels in the extended position to provide a seal between the panel assembly and the opening in the structure.

16. A folding panel assembly as claimed in claim 9 including means for assisting in movement of the panels from the extended to the retracted position including a spring biased shaft pivotally mounted adjacent one side of the opening, a drum mounted at each end of the shaft and a cable connected to the drum and to one end of the panel members whereby said cable is wound on to the drum during movement of the panels from the extended to the retracted position.

17. A folding panel assembly as claimed in claim 9 including a pair of links mounted adjacent opposite terminal ends of said elongated meshing gear teeth to prevent spiralling of the meshing gears during movement of the panels between extended and retracted positions.

18. A folding panel assembly as claimed in claim 9 wherein said pivot means comprises a hinge gear assembly at each end of adjacent panels of the pairs of panels, each said hinge gear assembly including a pair of links mounted on the end face of each of the adjacent panels of the pairs of panels, a control bar connecting the links to one another and to the control bar, a pair of meshing segmental gears pivotally connected to the guide bar, said gears having arm extensions and means connecting one of the links to one arm extension and the other link to the other arm extension.

References Cited

UNITED STATES PATENTS

| | | | |
|---|---|---|---|
| 1,000,707 | 8/1911 | Borg | 160—188 X |
| 1,962,913 | 6/1934 | Rutledge | 160 — 207 X |
| 2,037,693 | 4/1936 | Beauchamp | 160—40 |
| 2,045,060 | 6/1936 | Wheatley | 160—209 |
| 2,257,513 | 9/1951 | Pilcher | 160—201 X |
| 2,307,570 | 1/1943 | Cramer | 160—207 X |
| 3,160,200 | 12/1964 | McKee et al. | 160—189 |

FOREIGN PATENTS

| | | |
|---|---|---|
| 1,021,469 | 2/1953 | France. |
| 4,753 | 8/1914 | Great Britain. |
| 176,557 | 8/1934 | Switzerland. |

DAVID J. WILLIAMOWSKY, *Primary Examiner.*

HARRISON R. MOSELEY, *Examiner.*

P. M. CAUN, *Assistant Examiner.*